US008973953B2

(12) United States Patent
Hignett et al.

(10) Patent No.: US 8,973,953 B2
(45) Date of Patent: Mar. 10, 2015

(54) SEAL BETWEEN PIPE SECTIONS

(75) Inventors: Ian Harold Hignett, Norfolk (GB); Katsuo Ueno, Chiba (JP)

(73) Assignee: HSC High Sealed & Coupled Pte. Ltd., Singapore (SG)

( * ) Notice: Subject to any disclaimer, the term of this patent is extended or adjusted under 35 U.S.C. 154(b) by 182 days.

(21) Appl. No.: 13/054,937

(22) PCT Filed: Dec. 13, 2010

(86) PCT No.: PCT/GB2010/002260
§ 371 (c)(1),
(2), (4) Date: Jan. 19, 2011

(87) PCT Pub. No.: WO2012/066266
PCT Pub. Date: May 24, 2012

(65) Prior Publication Data
US 2012/0119488 A1   May 17, 2012

(30) Foreign Application Priority Data

Nov. 17, 2010  (GB) .................................. 1019413.2

(51) Int. Cl.
E21B 17/02 (2006.01)
F16L 15/00 (2006.01)

(52) U.S. Cl.
CPC .................................. F16L 15/004 (2013.01)
USPC ....................................................... 285/333

(58) Field of Classification Search
USPC ....................................... 285/333, 334, 334.4
See application file for complete search history.

(56) References Cited

U.S. PATENT DOCUMENTS

| 3,856,337 | A |   | 12/1974 | Ehm et al. |
| 4,009,893 | A | * | 3/1977  | Schatton et al. ............... 285/110 |
| 4,611,838 | A | * | 9/1986  | Heilmann et al. ............. 285/331 |
| 4,624,488 | A | * | 11/1986 | Furgerson ..................... 285/334 |
| 4,732,416 | A |   | 3/1988  | Dearden et al. |
| 4,770,444 | A | * | 9/1988  | Hauk .............................. 285/55 |
| 4,944,538 | A |   | 7/1990  | Read |
| 5,137,310 | A | * | 8/1992  | Noel et al. .................... 285/333 |

(Continued)

FOREIGN PATENT DOCUMENTS

| CA | 2507473 A1 | 6/2004 |
| DE | 2134274 B1 | 8/1972 |

(Continued)

OTHER PUBLICATIONS

International Search Report of the International Searching Authority (EPO) issued in connection with PCT/GB2010/002260 on, Sep. 7, 2011.

*Primary Examiner* — James Hewitt
(74) *Attorney, Agent, or Firm* — Levenfeld Pearlstein, LLC

(57) ABSTRACT

A pipe joint comprises a pin having a male screw-threaded portion and a box having a complementary screw-threaded portion. The threaded portions of the pin and box inter-engage along the greater part of the axial length of the threaded portions, the male thread extending to a male stop shoulder adjacent a complementary stop shoulder on the other portion. The pin further comprises a radial surface adjacent a corresponding radial surface on the complementary stop shoulder of the box, a curved sealing surface of the radial surface on the pin sealingly engaging a corresponding curved sealing surface on the corresponding radial surface on the complementary stop shoulder. Each of the curved sealing surfaces is so shaped to lie on an arc of a separate ellipse. The parameters of the ellipses are carefully chosen to maximize the strength and robustness of the seal.

21 Claims, 4 Drawing Sheets

(56) References Cited

U.S. PATENT DOCUMENTS

| | | | |
|---|---|---|---|
| 6,045,165 A * | 4/2000 | Sugino et al. | 285/333 |
| 2004/0084901 A1 | 5/2004 | Church | |
| 2005/0073147 A1* | 4/2005 | Hignett | 285/333 |
| 2006/0157982 A1* | 7/2006 | Hignett | 285/333 |

FOREIGN PATENT DOCUMENTS

| | | | |
|---|---|---|---|
| DE | 8707965 U1 | 7/1987 |
| DE | 19955377 A1 | 6/2001 |
| EP | 0254552 A1 | 1/1988 |
| GB | 2479259 A | 10/2011 |
| JP | 08135855 A | 5/1996 |
| JP | 09152067 A | 6/1997 |
| JP | 10148281 A | 6/1998 |
| WO | 03048623 A1 | 6/2003 |
| WO | 2010047406 A1 | 4/2010 |

* cited by examiner

SEAL BETWEEN PIPE SECTIONS

FIELD OF THE INVENTION

The present invention relates to an improved seal between two pipe sections. The pipe sections particularly contemplated find application in the oil and gas drilling industries.

BACKGROUND TO THE INVENTION

The production of steel pipes for use in the oil and gas drilling industries has been the subject of a large amount of research and innovation. Apart from the materials and the means of forming a cylindrical tube, one aspect which has been a focus of attention is the coupling together of two separate pipes to provide a fluid-tight joint capable of withstanding both tensive and compressive forces.

The joints are normally formed by screwing together two pipes, each having complementary threads pre-cut into the ends of each of the pipes: addition of further pipes to the free end continuing, to build up a string. As an alternative but related method, a threaded coupling-sleeve is used to bridge across the ends of two pipes, but the principle remains the same.

To improve the sealing properties of the joint produced between pipes, and to give a seal capable of withstanding repeated handling under normal operating conditions, the profile and surface of the threaded part of the end of the pipes and the regions immediately around the threaded part towards the end of the pipe, are specifically designed to co-operate together to provide the seal. Typically the end of the pipe has a threaded portion cut either onto the outside of the pipe (to form a pin or male section) or into the inner surface of the pipe (to form a box or female section). The surface onto which the threaded portion is introduced can include a taper to assist the coupling process.

Additionally, the diameter of the pipe in the seal forming region can have been increased in comparison to that predominating along the length of the pipe, usually by cold forming, to allow a joint to be formed.

On the pipe, an unthreaded section is normally left between the end of the pipe and the threaded section, which unthreaded section is often referred to as a stop-shoulder. Particular emphasis has been placed in research on the stop-shoulder as this often constitutes the primary sealing region of the pipe joint. The stop-shoulder on the pin is usually profiled to engage a corresponding recess on the box section to form a strong seal. The particular profile is normally chosen to disperse efficiently the strain experienced in the joint region of the pipe when torque is applied to form the joint between pipes and to retain the seal when the joint is in use. In addition to the profiling, coatings can also be applied to improve the fluid-tight nature of the seals.

However, as many reserves of oil and gas begin to run out and the price of these resources climbs there is an increasing requirement and opportunity to extract oil and gas from reserves which would have hitherto been uneconomic. For example, extraction needs to take place from deeper or more inaccessible levels. Moreover, there is also a desire where possible to use existing bore-holes as a starting point to reach the more difficult deposits. In addition, modern methods of drilling often utilise a single, generally vertical, downhole which is then diverted in the horizontal direction to pass through the oil or gas deposit.

The outcome of this is that pipe joints need to be able to withstand high temperatures and pressures—both tensive and compressive—than has previously been the case. For example, many strings need to have bends of around 90° when going from a vertical orientation to a horizontal one. Such a bend obviously causes both compressive and tensive forces to act on opposite sides of the same region of the joint.

One problem encountered on prior art joints is bending of the end of the pin on make-up of the joint. This can lead to galling: if not on the first time the joint is made up, then on subsequent make-ups. Although this problem can be addressed by increasing the tolerance on manufacture, this is an expensive solution and moreover does not completely remove the difficulties, particularly under normal working conditions.

A further problem encountered in the production of oil pipes lies in the production methods used to produce pipe sections which are intended for different uses within the industry. These are typically required to be made having different characteristics depending on the use to which the sections are to be put: for example tubing, casing etc. The present invention contemplates a pipe joint in which the sealing region is common across a wide range of pipe diameters resulting in a lowering of costs of manufacture.

It is an object of the present invention to seek to address the above problems.

SUMMARY OF THE INVENTION

According to a first aspect of the invention there is provided a pipe joint, the joint comprising:
a screw-threaded joint for pipes comprising a first pipe length or pin having at one end a male screw-threaded portion and a second pipe length or box having at one end a female portion having a complementary screw-thread, the portions being adapted to inter-engage along the greater part of the axial length of the threaded portions the screw threads thereof being inclined in the same direction and at an acute angle to the longitudinal axis of the pipe length, the male thread extending to a male stop shoulder adjacent a complementary stop shoulder on the other portion, the complementary stop shoulder comprising a recess in the form of a cone receiver having a rounded apex, the stop shoulder on the pin including a torque shoulder, frictionally engaging a corresponding shoulder in the complementary stop shoulder,
the stop shoulder on the pin further comprising a radial surface adjacent a corresponding radial surface on the complementary stop shoulder of the box, a curved sealing surface of the radial surface on the pin sealingly engaging a corresponding curved sealing surface on the corresponding radial surface on the complementary stop shoulder, the curved sealing surfaces each being so shaped to lie on an arc of a separate ellipse.

Preferably the long axis of the ellipse described by the curved sealing surface on the pin is at an angle of from 10.0-16.0° to the main axis of the pin and further preferably at an angle of from 11.0-14.0°.

The centre of the ellipse described by the curved sealing surface of the pin is preferably at a distance of from 0.2550-0.2800" in a direction toward the main body of the pipe and parallel to the longitudinal axis of the pipe, the distance being measured from the intersection point of the line extending from the torque shoulder and the radial surface.

The centre of the ellipse described by the curved sealing surface on the box is preferably at a distance of from 0.2550-0.2800" in a direction towards the torque shoulder of the box section and parallel to the longitudinal axis of the pipe, the distance measured from the intersection point of a line extending from the torque shoulder of the box section and from the radial surface.

Conveniently the centre of the ellipse described by the curved sealing surface of the pin is at a radial distance of from 0.0040-0.0065" from a line through the intersection point and parallel to the longitudinal axis of the pin section.

Conveniently the centre of the ellipse described by the curved sealing surface of the box is at a radial distance of from 0.0165-0.0200" from a line through the intersection point and parallel to the longitudinal axis of the box section.

Preferably, the long axis of the ellipse described by the curved sealing surface on the box is at an angle of from 5.0-8.0° to the main longitudinal axis of the box section and is further preferably at an angle of from 5.5-7.0°.

The long axis of the ellipse described by the curved sealing surface on the box section is preferably from 0.1420-0.1650" in length. The length of the short axis of the ellipse is preferably from 0.0180-0.0205" in length.

The long axis of the ellipse described by the curved sealing surface on the pin section is preferably from 0.1250-0.1550" in length. The length of the short axis of the ellipse is preferably from 0.0230-0.0300" in length.

BRIEF DESCRIPTION OF THE DRAWINGS

The invention will be now described with reference to the accompanying drawings which show one embodiment of a joint. In the drawings.

DETAILED DESCRIPTION OF THE INVENTION

The sealing region of a joint formed between the pin and the box section of the joining pipe sections is a critical one and many features have been introduced to provide a good seal. Said seals need to not just withstand and remain fluid tight where there is a pressure differential across the pipe wall, but also often need to maintain their integrity when the pipe string is describing a curve of up to 90° or more. The present invention addresses the problem by the provision of curved sealing surfaces on both the pin and the box sections, with each curved surface being separately able to be described in terms of an ellipse. In the cross-sectional illustrations utilised in this description, the curved surfaces are represented as two dimensional curved lines.

Although curved surfaces are known within the art, it has been found that the use of two elliptical surfaces, and in particular elliptical surfaces as defined and delimited herein provide a means of obtaining a seal which can be applied to pipes having a wide range of diameters such that the pipes can be used as tubing or casing.

The elliptical surfaces as herein defined can be easily engineered by conventional methods known in the art. It is preferred that the sealing surfaces utilised will be subject to a pre-treatment to enhance the structural strength of the surface, particularly against galling on make-up of the joint. For example, the pin section is typically pre-treated with phosphoric acid or by peening (such as with Aluminium or glass). Preferably, treatment with a molybdenum strengthening agent is also carried out.

The box section can also be pre-treated with phosphoric acid and/or with the molybdenum agent. Peening, although in principle suitable for the surface would not typically be used due to the location of the sealing surface within the body of the pipe section.

In addition to the above, a lubricant of a type known in the art would usually be used on make-up of the joint to reduce galling.

Figure 1:
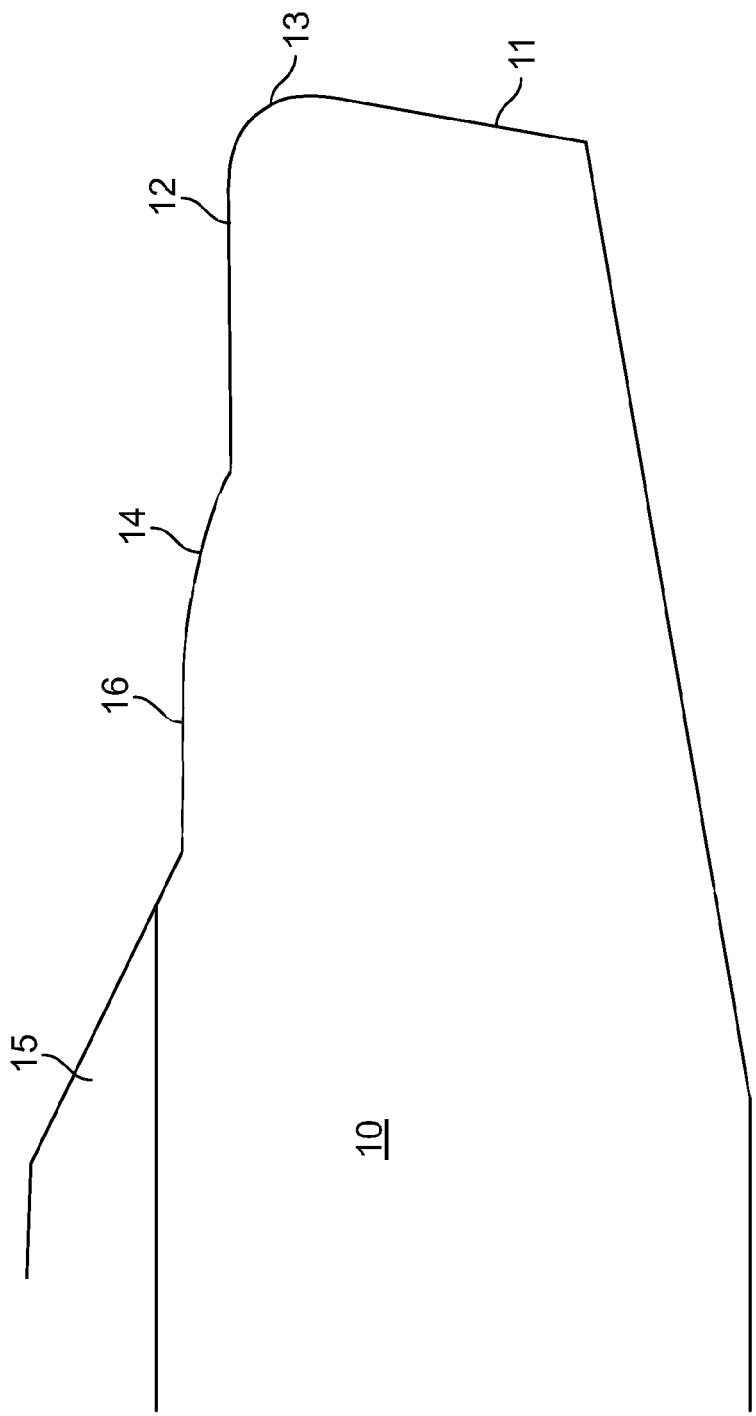
FIG. 1 is a section of the longitudinal axis of a pipe section, showing the sealing region of a pin seal.
Figure 3:
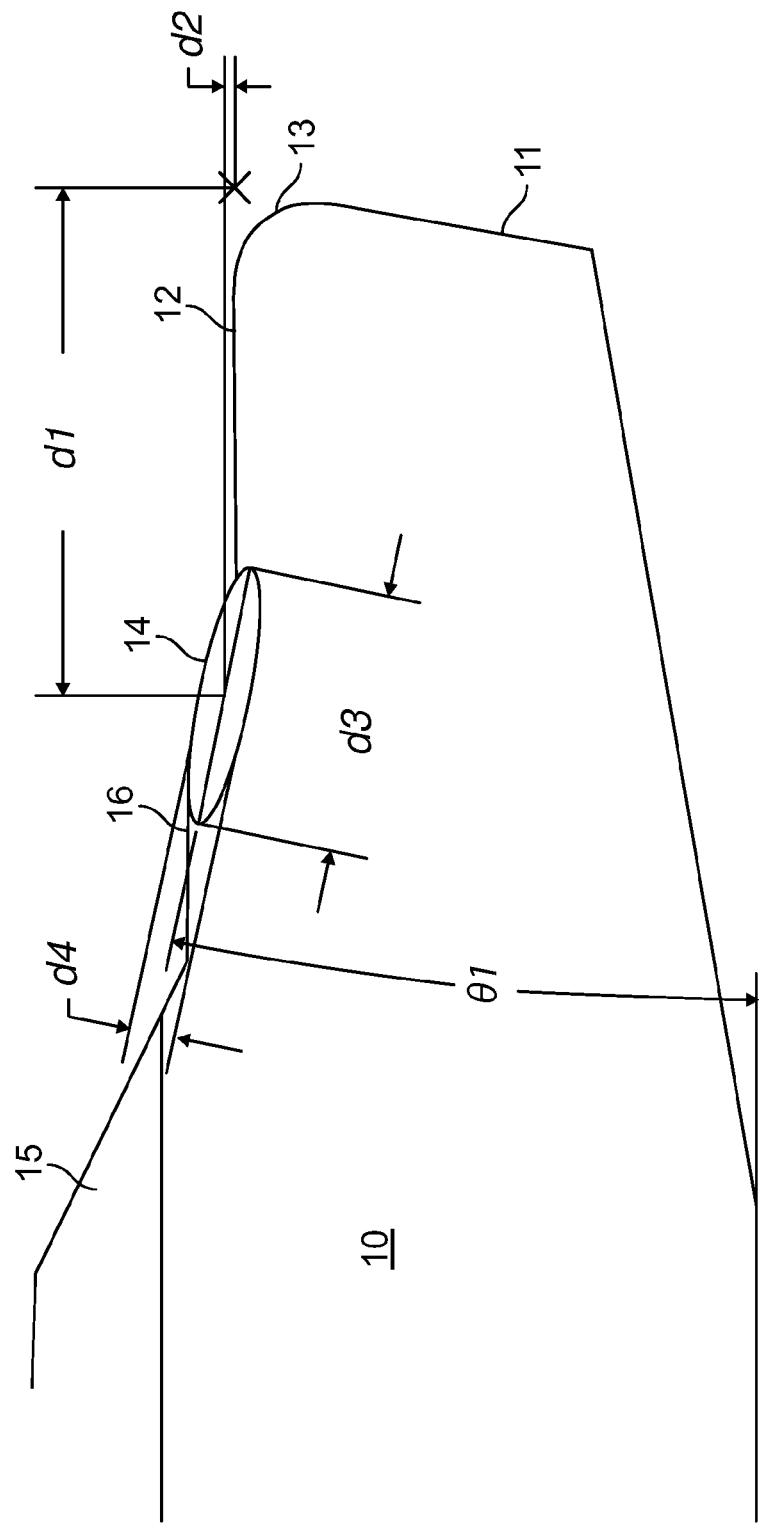
FIG. 3 is the sealing region of the pin seal of FIG. 1, showing dimensional references; and, FIG. 4 is the sealing region of the box seal of FIG. 2, showing dimensional references.

With reference to FIGS. 1 and 3, which illustrate the sealing region of a pin section, the following features should be noted. The pin, generally referenced 10, has an end torque surface 11 which in use engages a corresponding torque surface 21 on the box section. Although these two surfaces do produce on engagement, a seal, this seal is not a critical one between the two pipe sections. The torque surface 11 is joined to the planar radial surface 12 by a curved nose surface 13. The sealing surface 14 provides, in conjunction with the corresponding surface 24 on the box section 20, the main fluid-tight seal between adjoining pipe sections. The sealing surface 14 extends at one end from the surface 12 and is operatively connected to the first thread crest 15.

As indicated above the sealing surface 14 lies on a portion of the curve of an ellipse. It is important that the position and orientation of the ellipse be well-defined as detailed below.

In defining the ellipse on the pin section, the first point of reference does not lie in the pin 10 itself but is a point defined as the intersection between a line extending from the torque surface 11 and the radial surface 12. This is shown as an X in FIG. 3. The distance, d1, from the point X to the centre of the ellipse as measured in the direction parallel to the main longitudinal axis of the pipe and towards the main body of the pipe is 0.2696" (0.6848 cm). A range of values for this parameter, which is suitable has been found to be from 0.2550 to 0.2800" (0.6477-0.7112 cm). Radially, the centre of the ellipse is in the line parallel to the main axis of the pipe but displaced, d2, by 0.0053" (0.0135 cm) radially outwards from that axis. Typically the displacement, d2, can be from 0.0040-0.0065" (0.0102-0.0165 cm). The length, d3, of the long axis of the ellipse is 0.1356" (0.3444 cm) although a length, d3, of from 0.1250-0.1550" (0.3175-0.3937 cm) has been found to be suitable. The length, d4, of the short axis is 0.0257" (0.06528 cm), although a length, d4, of from 0.0230-0.0300" (0.0584-0.0762 cm) has been found to be suitable.

As is evident from the FIGS. 1 and 3, the long axis of the ellipse is, in order to produce the required surface, set at an angle, θ1, of 12° to the main axis of the pin section. However, a range for θ1 of from 10.0-16.0° and further preferably from 11.0-14.0° has been found to be suitable.

As set out above, the sealing surface 14 follows a portion of the thus-defined ellipse. Towards the distal end of the pipe, the sealing surface 14 joins the surface 12 whilst at the proximal end it smoothly joins the surface 16 linking the crest 15 with the sealing surface 14.

Figure 2:
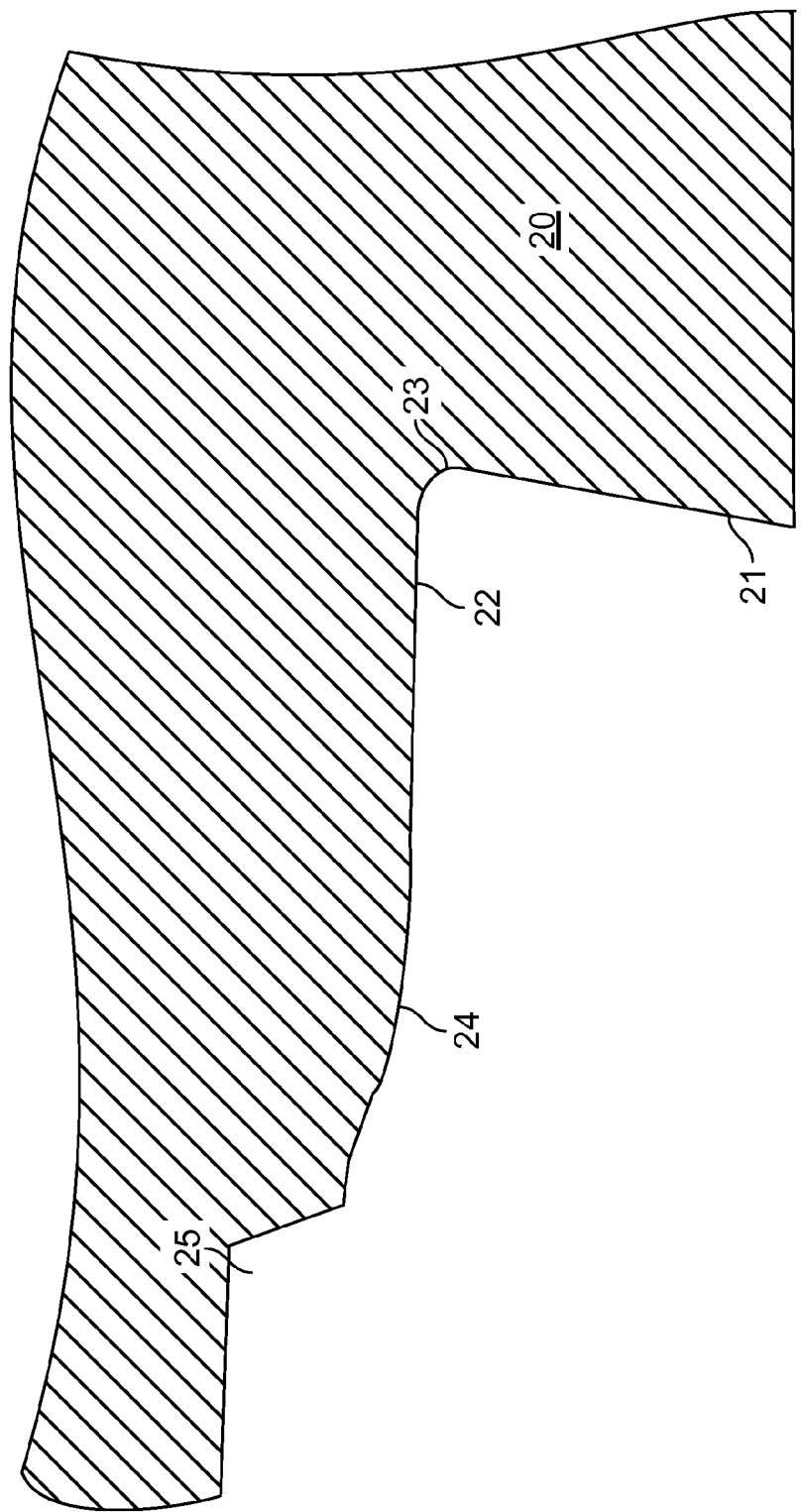
FIG. 2 is a section of the longitudinal axis of a pipe section, showing the sealing region of a box seal.
Figure 4:
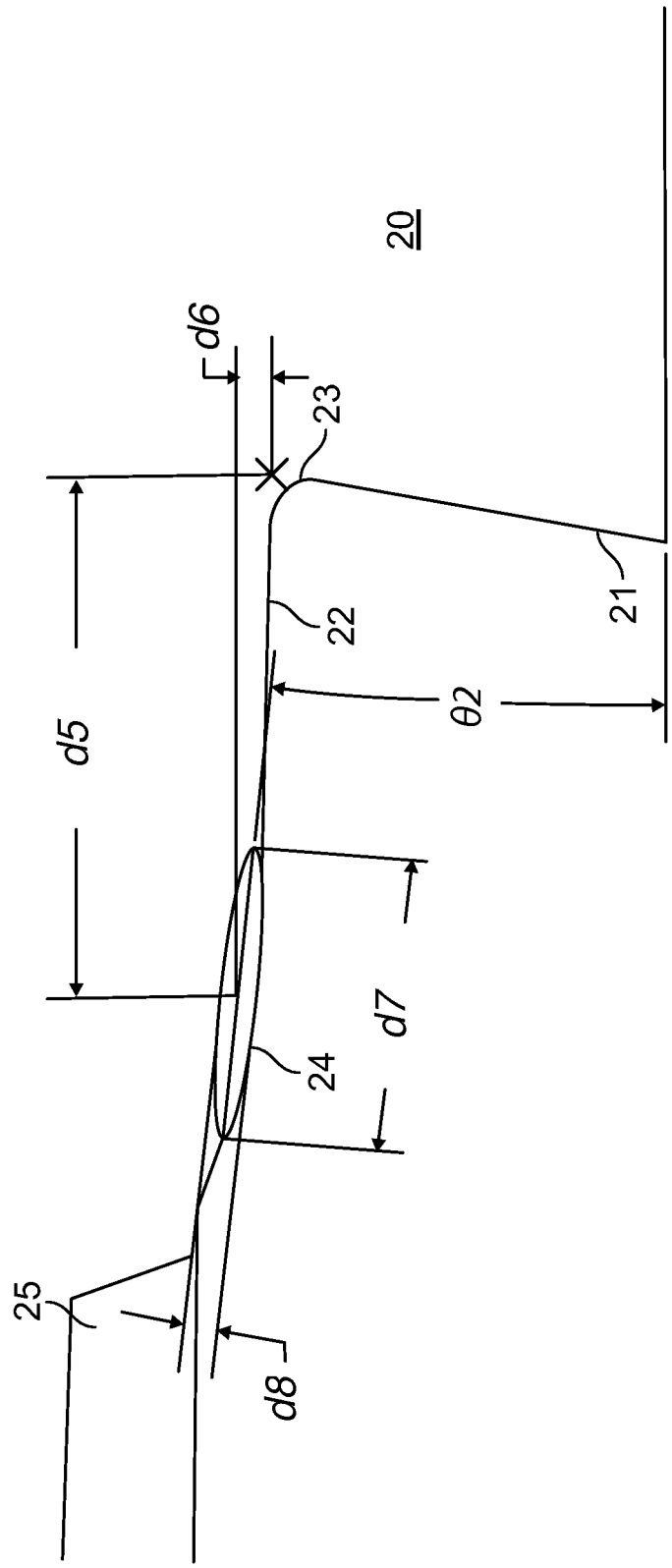

The corresponding sealing surface 24 on the box section 20 can be defined in similar fashion to that described for the pin 10 and is shown in FIGS. 2 and 4. The box section 20 has a recess, complementary in shape to the end of the pin section 10, which recess is defined by the surfaces as follows: a torque surface 21 is of the same or similar orientation relative to the main axis of the box section 20 as the torque surface 11 and engages frictionally or sealingly with the torque surface 11 on make-up of the joint between the pin and box sections. The torque surface 21 is joined by curved surface 23 to the planar surface 22. The sealing surface 24 then extends smoothly from the planar surface 22 and is operably connected to the first crest 25 of the thread on the box section 20.

The sealing surface 24 again follows a portion of an ellipse which is defined as follows. Firstly, the surfaces 21 and 22 are extended to define a point which actually lies within the body of the box section 20. This point is shown with an X in FIG. 4. The centre of the ellipse is then set to be at a distance, d5, as measured in the direction of the line parallel to the main longitudinal axis away from the main body of the box section 20 of 0.2652" (0.6736 cm). It has been found that a suitable range of values for the distance d5 is from 0.2550-0.2800" (0.6477-0.7112 cm). Radially, the centre of the ellipse is on the line parallel to the main axis of the pipe but displaced, d6, by, 0.0178" (0.0452 cm) radially outwards from that axis. Typically the displacement d6 can be from 0.0165-0.0200" (0.0149-0.0508 cm).

The length, d7, of the long axis of the ellipse is 0.1503" (0.3818 cm), although a length d7 of from 0.1420-0.1650" (0.3607-0.4191 cm) has been found to be suitable. The length, d8, of the short axis is 0.0192" (0.0488 cm), although a length d8 of from 0.0180-0.0205" (0.4572-0.5207 cm) has been found to be suitable.

As with the elliptical surface on the pin section, the long axis of the ellipse is set at an angle, θ2, to that of the main longitudinal axis of the pipe. In the case of the box section, the long axis of the ellipse is at an angle θ2 of 6.195°, although a range of from 5.0-8.0° has been found to be suitable and a range of 5.5-7.0° particularly suitable.

In use therefore, on make-up of the joint, the pin and box section are brought together through engagement of the threaded sections of the pin and the box, by the application of torque. Torque is applied until a seal is formed between the two sections. This situation is usually recognised by monitoring the magnitude of torque applied. The advantage of using two curved surfaces to provide a seal which is capable of maintaining integrity under tensive or compressive forces, including bending of the joint can now be seen. If such forces act, the curved surfaces 'roll' against each other, and although the sealing point may move, its integrity remains intact. The present invention utilises two elliptically curved surfaces in which the curvature, the dimensions and the orientation of the ellipses is selected to provide an effective seal which is capable of retaining its integrity as the two pipes move or are subjected to unequal internal and external pressures.

In addition, it is recognised that the end of the pin has a tendency, due to the forces exerted thereon to bend inwardly. If this process goes too far then the deformation can become so acute that on subsequent make-ups, galling can occur as the end of the pin cuts into the box section.

It will of course be understood that the invention is not limited to the specific details described herein, which are given by way of example only, and that various modifications and alterations are possible within the scope of the invention.

The invention claimed is:

1. A pipe joint, the pipe joint comprising:
   a first pipe, the first pipe comprising a pin, wherein the pin comprises a male screw-threaded portion having male screw threads;
   a second pipe, the second pipe comprising a box, wherein the box comprises a female screw-threaded portion having female screw threads, the female screw-threaded portion of the box configured to complementarily engage the male screw-threaded portion of the pin, wherein the male screw-threaded portion of the pin and the female screw-threaded portion of the box are configured to engage one another along at least half of an axial length of the male screw-threaded portion and the female screw-threaded portion, wherein the male screw threads and the female screw threads are inclined in the same direction and at an acute angle to a longitudinal axis of the first pipe and the second pipe, wherein the male screw threads of the male screw-threaded portion extend to a male stop shoulder adjacent to a complementary female stop shoulder on the female screw-threaded portion, the female stop shoulder comprising a recess formed as a cone receiver having a rounded apex, and wherein the male stop shoulder comprises a male torque shoulder, the male torque shoulder frictionally engaging a corresponding female torque shoulder formed in the female stop shoulder;
   a pin radial surface on the male stop shoulder, disposed between the male torque shoulder and male screw-threaded portion, on the pin, adjacent a corresponding box radial surface on the female stop shoulder, disposed between the female torque shoulder and the female screw-threaded portion, on the box; and
   a pin curved sealing surface, disposed between the pin radial surface and the male screw-threaded portion, on the pin, facing outwardly away from the longitudinal axis, sealingly engaged with a corresponding box curved sealing surface, disposed between the box radial surface and the female screw-threaded portion, on the box, facing outwardly towards the longitudinal axis,
   wherein the pin curved sealing surface and the box curved sealing surface each are shaped to lie on respective arcs of separate ellipses.

2. The pipe joint of claim 1, wherein an angle between a long axis of the ellipse on which the pin curved sealing surface lies and the longitudinal axis of the first pipe and the second pipe is from about 10.0° to about 16.0°.

3. The pipe joint of claim 2, wherein the angle is from about 11.0° to about 14.0°.

4. The pipe joint of claim 1, wherein a center of the ellipse on which the pin curved sealing surface lies is disposed at a distance from about 0.2550" to about 0.2800" from an intersection point of a first line extending from the male torque shoulder and a second line extending from the pin radial surface.

5. The pipe joint of claim 1, wherein a center of the ellipse on which the box curved sealing surface lies is disposed at a distance from about 0.2550" to about 0.2800" from an intersection point of a first line extending from the female torque shoulder and a second line extending from the box radial surface.

6. The pipe joint of claim 1, wherein a first center of the ellipse on which the pin curved sealing surface lies is disposed at a distance from about 0.2550" to about 0.2800" from a first intersection point of a first line extending from the male torque shoulder and a second line extending from the pin radial surface, and wherein a second center of the ellipse on which the box curved sealing surface lies is disposed at a distance from about 0.2550" to about 0.2800" from a second intersection point of a third line extending from the female torque shoulder and a fourth line extending from the box radial surface.

7. The pipe joint of claim 6, wherein the first center of the ellipse on which the pin curved sealing surface lies is disposed at a radial distance from about 0.0040" to about 0.0065" from a fifth line parallel to the longitudinal axis of the first pipe and the second pipe and through the first intersection point.

8. The pipe joint of claim 6, wherein the second center of the ellipse on which the box curved sealing surface lies is disposed at a radial distance from about 0.0165" to about 0.0200" from a fifth line parallel to the longitudinal axis of the first pipe and the second pipe and through the second intersection point.

9. The pipe joint of claim 6, wherein an angle between a long axis of the ellipse on which the box curved sealing surface lies and the longitudinal axis of the first pipe and the second pipe is from about 5.0° to about 8.0°.

10. The pipe joint of claim 6, wherein a long axis of the ellipse on which the box curved sealing surface lies has a length from about 0.1420" to about 0.1650".

11. The pipe joint of claim 6, wherein a short axis of the ellipse on which the box curved sealing surface lies has a length from about 0.0180" to about 0.0205".

12. The pipe joint of claim 6, wherein a long axis of the ellipse on which the pin curved sealing surface lies has a length from about 0.1250" to about 0.1550".

13. The pipe joint of claim 6, wherein a short axis of the ellipse on which the pin curved sealing surface lies has a length from about 0.0230" to about 0.0300".

14. The pipe joint of claim 1, wherein a center of the ellipse on which the pin curved sealing surface lies is disposed at a radial distance from about 0.0040" to about 0.0065" from a first line parallel to the longitudinal axis of the first pipe and the second pipe and through an intersection point of a second line extending from the male torque shoulder and a third line extending from the pin radial surface.

15. The pipe joint of claim 1, wherein a center of the ellipse on which the box curved sealing surface lies is disposed at a radial distance from about 0.0165" to about 0.0200" from a first line parallel to the longitudinal axis of the first pipe and the second pipe and through an intersection point of a second line extending from the female torque shoulder and a third line extending from the box radial surface.

16. The pipe joint of claim 1, wherein an angle between a long axis of the ellipse on which the box curved sealing surface lies and the longitudinal axis of the first pipe and the second pipe is from about 5.0° to about 8.0°.

17. The pipe joint of claim 16, wherein the angle is from about 5.5° to about 7.0°.

18. The pipe joint of claim 1, wherein a long axis of the ellipse on which the box curved sealing surface lies has a length from about 0.1420" to about 0.1650".

19. The pipe joint of claim 1, wherein a short axis of the ellipse on which the box curved sealing surface lies has a length from about 0.0180" to about 0.0205".

20. The pipe joint of claim 1, wherein a long axis of the ellipse on which the pin curved sealing surface lies has a length from about 0.1250" to about 0.1550".

21. The pipe joint of claim 1, wherein a short axis of the ellipse on which the pin curved sealing surface lies has a length from about 0.0230" to about 0.0300".

* * * * *

UNITED STATES PATENT AND TRADEMARK OFFICE
CERTIFICATE OF CORRECTION

| | |
|---|---|
| PATENT NO. | : 8,973,953 B2 |
| APPLICATION NO. | : 13/054937 |
| DATED | : March 10, 2015 |
| INVENTOR(S) | : Hignett et al. |

It is certified that error appears in the above-identified patent and that said Letters Patent is hereby corrected as shown below:

In the specification,

Column 1, line 1, under "Title" insert --CROSS-REFERENCE TO RELATED APPLICATIONS This is a National Stage Application of International Patent Application No. PCT/GB2010/002260 filed December 13, 2010, which claims the benefit of and priority to United Kingdom Patent Application No. GB1019413.2, filed November 17, 2010, the contents of each of which are incorporated fully by reference herein--.

Column 4, line 35, ", d2," to read as --d2--.

Column 4, line 38, ", d3," to read as --d3--.

Column 4, line 40, ", d4," to read as --d4--.

Column 5, line 9, "by," to read as --by--.

Signed and Sealed this
Twelfth Day of January, 2016

Michelle K. Lee
*Director of the United States Patent and Trademark Office*